United States Patent [19]

Arika et al.

[11] Patent Number: 4,587,115
[45] Date of Patent: May 6, 1986

[54] PROCESS FOR PREPARATION OF HIGH-SILICA FAUJASITE TYPE ZEOLITE

[75] Inventors: Junji Arika, Tokuyama; Michiyuki Aimoto, Kudamatsu; Hiroshi Miyazaki, Shinnanyo, all of Japan

[73] Assignee: Toyo Soda Manufacturing Co., Ltd., Shinnanyo, Japan

[21] Appl. No.: 618,945

[22] Filed: Jun. 8, 1984

[30] Foreign Application Priority Data

Jun. 9, 1983 [JP] Japan .................. 58-101708

[51] Int. Cl.$^4$ .................................. C01B 33/28
[52] U.S. Cl. ........................... 423/329; 502/79
[58] Field of Search ............... 423/328, 329; 502/79

[56] References Cited

U.S. PATENT DOCUMENTS

| | | | |
|---|---|---|---|
| 3,130,007 | 4/1964 | Breck | 423/328 |
| 3,425,800 | 2/1969 | Hirsh | 423/329 |
| 4,248,847 | 2/1981 | Derleth et al. | 423/329 |
| 4,376,106 | 3/1983 | Miyanohara et al. | 423/329 |

FOREIGN PATENT DOCUMENTS

| | | | |
|---|---|---|---|
| 2014451 | 4/1970 | France | 423/328 |
| 1145995 | 3/1969 | United Kingdom | 423/328 |

*Primary Examiner*—Edward J. Meros
*Attorney, Agent, or Firm*—Cushman, Darby & Cushman

[57] ABSTRACT

A faujasite type zeolite having a high $SiO_2/Al_2O_3$ ratio is prepared by simultaneously and continuously supplying an aqueous solution of an alkali metal silicate and an aqueous solution of an aluminum-containing compound whereby the alkali metal silicate is continuously reacted with the aluminum-containing compound to prepare a homogeneous phase compound of a granular amorphous aluminosilicate containing aluminum in an amount of 10 to 16% by weight, as $Al_2O_3$ and based on the anhydride; and then, crystallizing the granular homogeneous phase amorphous aluminosilicate in an aqueous alkali metal hydroxide solution having a concentration of 4 to 10% by weight.

15 Claims, 2 Drawing Figures

PROCESS FOR PREPARATION OF HIGH-SILICA FAUJASITE TYPE ZEOLITE

BACKGROUND OF THE INVENTION (1) Field of the Invention

The present invention relates to a process for the preparation of a faujasite type zeolite, especially a faujasite type zeolite having a high silica content.

(2) Description of the Prior Art

A faujasite type zeolite ordinarily has an oxide molar composition represented by the following formula:

$$0.9 \pm 0.2 M_2O \cdot Al_2O_3 \cdot xSiO_2 \cdot wH_2O$$

wherein M stands for an alkali metal cation, x is a number of from 2.5 to 6, and w is a number of from 6 to 9. Faujasite type zeolites are used as a cracking catalyst for petroleum, and an adsorptive separating agent for use in separation of paraxylene or the like.

Ordinarily, these catalysts or adsorptive separating agents are required to have good heat resistance and acid resistance. In case of a faujasite type zeolite, the $SiO_2/Al_2O_3$ molar ratio has close relations to these properties, and a faujasite type zeolite having a higher $SiO_2/Al_2O_3$ molar ratio is excellent in these properties.

A faujasite type zeolite having a relatively low silica ratio, that is, an $SiO_2/Al_2O_3$ molar ratio of 2.5 to 4, is poor in the heat resistance and the acid resistance because of this low silica molar ratio, and therefore, faujasite type zeolites having an $SiO_2/Al_2O_3$ molar ratio of at least 4 are widely used industrially and high-silica faujasite type zeolites having an $SiO_2/Al_2O_3$ molar ratio of at least 4.5 are especially desired. However, it has been considered difficult to synthesize faujasite type zeolites having an $SiO_2/Al_2O_3$ molar ratio of at least 4.5, especially at least 5, on an industrial scale with a good reproducibility. In the synthesis of faujasite type zeolites, the intended zeolites are produced only under very restricted conditions. Accordingly, the kinds and quantitative ratios of starting materials should be strictly and carefully selected and the reaction should be carefully carried out while strictly controlling such conditions as the mixing state, the degree of aging, the reaction temperature and the reaction time. These difficulties are increased when it is intended to prepare a faujasite zeolite having such a high $SiO_2/Al_2O_3$ molar ratio as described above and having a high purity.

Various processes have heretofore been proposed for preparing high-silica faujasite type zeolites. According to a typical process disclosed in Japanese Examined patent publication No. 36-1639 or No. 42-16941, a silica source such as silica sol, silica gel or finely divided solid silicic acid, sodium aluminate and sodium hydroxide are used as the starting materials and these starting materials are reacted under strictly controlled conditions to form a faujasite type zeolite having an $SiO_2/Al_2O_3$ molar ratio of at least 4. In this process, however, it is indispensable that expensive amorphous solid silica should be used as the silica source and therefore, a faujasite type zeolite cannot be produced at a low cost.

Furthermore, a fatal defect is encountered when it is intended to synthesize a faujasite type zeolite in an industrial scale with a good reproducibility. Namely, it is impossible to carry out the reaction while stirring and mixing the reaction system. Especially when stirring is effected at the step of converting an amorphous reaction product of an aqueous gel, formed through long-time aging after mixing of the starting materials, (this product is considered to be a precursor before crystallization) to a faujasite type zeolite, crystallization to the intended faujasite type zeolite is inhibited and the majority of the product is converted to an aluminosilicate mineral of no practical utility such as a naturally occurring phillipsite mineral analogues (hereinafter referred to as "phillipsite") and gmelinite. Accordingly, in order to synthesize a high-silica faujasite type zeolite having a high purity, it is indispensable that the synthesis should be carried out while the reaction mixture in the form of an aqueous gel is allowed to stand still and mixing under stirring shoud be avoided. However, if this synthesis process under the stationary condition is carried out on an industrial scale, is required to effect the heat transfer for maintaining the reaction temperature, stirring is not conducted and, thus, the heat transfer in the reaction system becomes difficult and the temperature becomes uneven, resulting in such a disadvantage as simultaneous formation of phillipsite and gmelinite. Various means are adopted for avoiding simultaneous formation of phillipsite and gmelinite in the abovementioned stationary synthesis process, but the problem of simultaneous formation of phillipsite and gmelinite has not been completely solved.

Moreover, as means for reducing the manufacturing cost of a high-silica faujasite type zeolite, there have been proposed various improved processes. For example, Japanese Examined patent publication No. 49-13720 discloses a process for preparing a faujasite type zeolite having an $SiO_2/Al_2O_3$ molar ratio of at least 4 by using as the silica source cheap sodium silicate which has been considered to be unable to give a high-silica faujasite type zeolite, wherein an aqueous mixture comprising hydrous solid silica, sodium aluminate and sodium hydroxide is aged to form an intermediate product and a small amount of this intermediate product is added as a crystal nucleus to a gel formed from a second aqueous mixture comprising sodium silicate and sodium aluminate.

Furthermore, Japanese Unexamined patent publication No. 47-4866 discloses a process for preparing a faujasite type zeolite having an $SiO_2/Al_2O_3$ molar ratio of at least 4 by using cheap sodium silicate, wherein an amorphous nucleus-forming core substance (seed) which has been prepared in advance and has an average particle size of 0.01 to 0.1 μm is added to a reaction mixture comprising sodium silicate, sodium aluminate and aluminum sulfate.

Moreover, Japanese Examined patent publication No. 53-33556 discloses a process for preparing a faujasite type zeolite having an $SiO_2/Al_2O_3$ molar ratio of 4.5, wherein a mixture of sodium silicate and kaolin is used as the silica and alumina source and a zeolite seed prepared in advance from an aqueous mixture of sodium silicate and sodium aluminate is added to the above mixture.

In each of these processes, a specific combination of the starting materials is used and specific means such as addition of a seed is adopted. In these processes, the manufacturing cost can be reduced by using cheap sodium silicate as the silica source, but the process steps become complicated as compared with the steps adopted in the conventional processes and hence, these processes are not especially preferred from the industrial viewpoint. Moreover, the problem how to effect the synthesis under stirring of the reaction mixture for a large-scale production has not been solved in these processes.

SUMMARY OF THE INVENTION

It is a primary object of the present invention to provide a process for the preparation of a faujasite type zeolite, which is quite different from the conventional processes, wherein an aqueous solution of an alkali metal silicate is used as the silica source, and a faujasite type zeolite having a desired high silica ratio (i.e., a $SiO_2/Al_2O_3$ molar ratio of at least 4.5) and a high purity can be obtained with a good reproducibility and in a large production scale. In this process, an aqueous solution of a cheap alkali metal silicate can be used as all of the silica source and the reaction can be carried out under stirring.

In accordance with the present invention, there is provided a process for preparing a zeolite, which process comprises the steps of: simultaneously and continuously supplying an aqueous solution of an alkali metal silicate and an aqueous solution of an aluminum-containing compound into a reaction zone whereby the alkali metal silicate is continuously reacted with the aluminum-containing compound to prepare a homogenous phase compound (hereinafter referred to as "homogeneous compound" for brevity) of a granular amorphous aluminosilicate containing aluminum in an amount of 10 to 16% by weight (based on the anhydride) as $Al_2O_3$; and then, crystallizing the granular homogeneous phase amorphous aluminosilicate in an aqueous alkali metal hydroxide solution having a concentration of 4 to 10% by weight.

DESCRIPTION OF THE PREFERRED EMBODIMENTS

Figure 1:
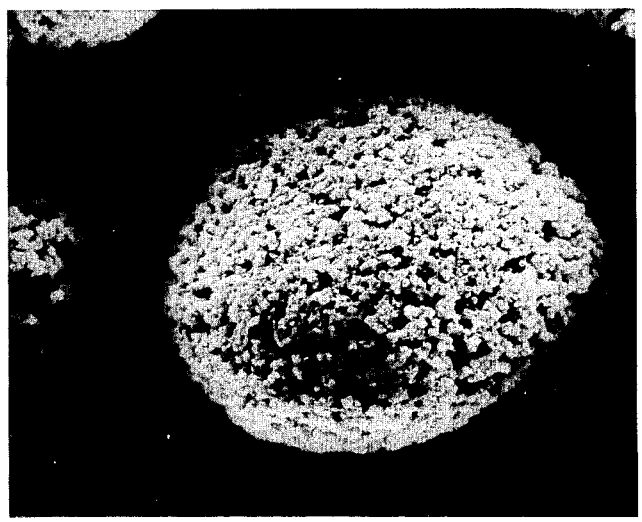
FIG. 1 is an electron microscope photograph of the homogeneous phase compound of the granular amorphous aluminosilicate obtained in Example 1.

The homogeneous compound is obtained by simultaneously and continuously supplying into a reaction zone an aqueous alkali metal silicate solution and an aluminum-containing aqueous solution whereby these reactants are continuously reacted with each other. It is preferable that these reactants are supplied into the reaction zone at a substantially constant ratio.

As the aqueous alkali metal silicate solution, there are preferably used aqueous solutions of sodium silicate, potassium silicate and lithium silicate, and as the aluminum-containing aqueous solution, there are preferably used aqueous solutions of aluminum sulfate, aluminum nitrate, aluminum chloride, sodium aluminate and potassium aluminate. If necessary, a caustic alkali may be added to the former solution or a mineral acid may by added to the latter solution, so that the amount of the acid or alkali is adjusted.

A commercially available aqueous solution of an alkali metal silicate and a commercially available aqueous solution of an aluminum salt of a mineral acid or an alkali metal aluminate may be used as the abovementioned aqueous solutions. Moreover, an aqueous solution formed by dissolving a silica source such as siliceous sand or hydrous solid silicic acid with a caustic alkali, or an aqueous solution formed by dissolving an aluminum source such as aluminum hydroxide or active alumina with a caustic alkali or mineral acid may be used.

The concentrations of both the aqueous solutions are not particularly critical, but aqueous solutions having an optional concentration may be used.

According to a most preferred embodiment for the production of the homogeneous compound, both the aqueous solutions are simultaneously and continuously supplied into an overflow-type reaction tank provided with a stirrer where the reaction is carried out.

The granular homogeneous compound obtained according to this preferred embodiment has a substantially spherical shape, and most of particles have a particle size distributed in the range of from 1 to 500 μm and the number of fine particles having a size smaller than 1 μm is very small. In carrying out the present invention, it is preferred that a homogeneous compound having a particle size of 10 to 100 μm be used.

The supply ratio of both the aqueous solutions may optionally be determined according to the intended composition of the homogeneous compound. The liquid reaction mixture is a slurry in which the formed spherical homogeneous compound is suspended. The pH value of the slurry is adjusted by the amount of the alkali or acid to be added to the starting aqueous solutions. It is ordinarily preferred that the pH value of the slurry be adjusted to 5 to 9, especially 6 to 8.

The time for the residence of the slurry in the reaction tank is preferably at least 3 minutes. By the term "residence time" is meant a time from the point of simultaneous and continuous supply of both the aqueous solutions to the reactor to the point of flowing out of the reaction slurry from the reactor. When the residence time is shorter than 3 minutes, the proportion of formation of fine particles having a size smaller than 1 μm is undesirable increased, and, in the course of formation of high-silica faujasite type zeolite having a high purity by carrying out the reaction while stirring the reaction mixture, an undesirable phenomenon such as simultaneous formation of impurities is caused to occur. On the other hand, if the residence time is at least 3 minutes, the product is composed substantially of spherical particles and formation of fine particles is remarkably reduced. As the residence time is prolonged, the particle size is increased and simultaneously, the hardness of the spherical particles is increased. Therefore, the size and hardness of the formed spherical particles can be varied by controlling the residence time, and hence, the reactivity of the homogeneous compound can be adjusted according to the object.

As another embodiment for the production of the homogeneous compound, there may be adopted a so-called batchwise continuous process in which both the aqueous solutions are simultaneously and continuously supplied at constant rates into a reactor under stirring conditions. In this case, it is preferred that both the aqueous solutions be not promptly added but necessary amounts of the aqueous solutions be added over a period of at least 10 minutes, especially at least 30 minutes. The reaction temperature for formation of the homogeneous compound is not particularly critical, and spherical particles can be obtained at either a low temperature or a high temperature and the formed particles can be used in the present invention.

One of the characteristic feature of the present invention is that since both the aqueous solutions having a concentration adjusted are simultaneously and continuously supplied at a constant ratio into a reactor where the reactants are continuously reacted with each other, the formed spherical homogeneous compound always has a constant composition and the product has no heterogeneous portion and hence, co-presence of impurities due to the heterogeneous composition can be completely avoided at the crystallizing step.

For example, if one aqueous solution is added to the other aqueous solution according to the conventional batchwise method, a pasty product having a high viscosity is formed and homogenization of the product cannot be attained however violently the stirring may be carried out. Even if homogenization is seemingly attained by sufficient mixing, microscopic heterogeneity of the composition cannot be avoided.

Another characteristic feature of the present invention is that by using the homogeneous compound, it is made possible to perform stirring of the reaction mixture at the crystallizing step. Since the homogeneous compound has a uniform composition with no heterogeneity and is in the form of spherical particles having a certain size, formation of a faujasite type zeolite is advanced uniformly in the individual particles at the crystallizing step. Because of this peculiar reaction mode, crystallization is advanced in the interiors of the respective particles in the stationary state. Accordingly, synthesis under stirring, which has been impossible according to the conventional methods and improvements thereof, can be carried out conveniently, and it is rendered possible to prepare a high-purity faujasite type zeolite having an $SiO_2/Al_2O_3$ molar ratio of at least 4.5, especially at least 5, on an industrial scale with a good reproducibility.

According to the conventional batchwise method, the above-mentioned pasty reaction product has a very high viscosity, and therefore, the concentration of the effective component is considerably limited. In contrast, in the present invention, since the homogeneous compound is in the form of spherical particles having a particle size of 1 to 500 μm, the viscosity of the reaction slurry is low and such a strong stirring as required in the above-mentioned batchwise method is not necessary and the concentration of the reaction slurry can be considerably increased.

The homogeneous compound of the present invention is obtained in the form of spherical particles having an appropriate size, and therefore, solid-liquid separation and washing can be performed very easily. Moreover, since the homogeneous compound is excellent in the water-removing property, even if the homogeneous compound is used in the wet state, a broad range of the water balance can be set when a slurry of the homogeneous compound to be subjected to crystallization is prepared. This is still another characteristic feature of the present invention.

It is preferred that the washed homogeneous compound be used in the wet state, but of course, it may be used after drying.

Various homogeneous compounds differing in the composition can be obtained according to the above-mentioned method. In carrying out the present invention, it is indispensable that the homogeneous compound should contain aluminum in an amount of 10 to 16% by weight as $Al_2O_3$ (based on the anhydride). If the $Al_2O_3$ content of the homogeneous compound is outside the above-mentioned range, impurities such as phillipsite and gmelinite are simultaneously formed and contained in the product. The homogeneous compound having an $Al_2O_3$ content of 10 to 16% by weight can be obtained by adjusting the flow rate ratio of both the aqueous solutions while taking the concentrations of $SiO_2$ and $Al_2O_3$ in both the aqueous solutions into consideration. For example, a homogeneous compound having a higher $Al_2O_3$ can be obtained by increasing the $Al_2O_3$ concentration or flow rate of the aluminum-containing solution.

Then, crystallization is accomplished by heating the homogeneous compound in an aqueous solution of an alkali metal hydroxide. In the present invention, crystallization can be carried out under stirring, but crystallization may be performed in the stationary state as in the conventional method.

As the aqueous solution of the alkali metal hydroxide, there may be used aqueous solutions of sodium hydroxide, potassium hydroxide and lithium hydroxide and mixtures thereof. Among them, an aqueous solution of sodium hydroxide is most preferred.

The concentration of the aqueous alkali metal hydroxide solution used for crystallization is 4 to 10% by weight. If the concentration of the alkali metal hydroxide is too high and exceeds the above-mentioned range, the $SiO_2/Al_2O_3$ molar ratio in the formed faujasite type zeolite is reduced, and the intended high-silica faujasite type zeolite cannot be obtained. If the above molar ratio is too low and below the above-mentioned range, crystallization becomes difficult.

The amount of the aqueous solution of the alkali metal hydroxide is set so that the content of the homogeneous compound in the starting slurry to be used for crystallization is 15 to 35% by weight based on the total amount of the starting slurry (based on the anhydride).

In one preferred embodiment of the present invention, at the step of crystallizing the homogeneous compound in the aqueous alkali metal hydroxide solution, a part of the homogeneous compound to be used is aged in the aqueous alkali metal hydroxide solution in advance. It is preferred that the amount of the homogeneous compound to be aged in advance be 10 to 30% by weight based on the total amount of the homogeneous compound to be used, and good results are obtained when the concentration of the aqueous solution of the alkali metal hydroxide be at least 25% by weight in case of an aqueous sodium hydroxide solution. Aging is carried out under stirring at an ambient temperature of 10° to 95° C., preferably 20° to 70° C., for 0.5 to 12 hours, preferably 1 to 4 hours.

If this aging step is adopted, the time required for crystallization can be remarkably shortened. For example, in the conventional method, a crystallization time of 72 to 96 hours is necessary for synthesizing a high-purity faujasite type zeolite having an $SiO_2/Al_2O_3$ molar ratio of 5 to 5.5, but in the present invention, crystallization is completed within such a short time as 10 to 24 hours. Moreover, in the conventional method, since an extremely long time is necessary for obtaining a high-purity faujasite type zeolite having an $SiO_2/Al_2O_3$ molar ratio of at least 5.5, production of this faujasite type zeolite on an industrial scale is very difficult though possible on a bench scale. In the present invention, by using the homogeneous compound as the intermediate product and adopting the aging step, a high-purity faujasite type zeolite having an $SiO_2/Al_2O_3$ ratio of 5.5 to 6.5 can easily be obtained on an industrial scale for a very short crystallization time, for example, 20 to 40 hours.

In the present invention, the particle size of the formed faujasite type zeolite can be controlled by appropriately setting the aging conditions. For example, if aging is carried out at a high temperature for a short time, the particle size is increased, and if aging is carried out at a low temperature for a long time, a faujasite type zeolite having a small particle size is obtained. If the step of adding a seed crystal, as adopted in the improved technique of the conventional method, is adopted instead of the above-mentioned aging step, the crystallization step can be effectively shortened, but in this case, a part of the added crystal is likely to be converted to impurities such as phillipsite or gmelinite, and hence, addition of the seed crystal is not preferred for attaining the object of obtaining a high-purity faujasite type zeolite.

After completion of the aging operation, the remainder of the homogeneous compound and water or a dilute aqueous solution of an alkali metal hydroxide are added, and the concentration and amount of the alkali metal hydroxide are adjusted and the crystallization step is started.

The crystallization temperature is 75° to 130° C. If the crystallization temperature is lower than 75° C., the crystallization time becomes too long, and if the crystallization temperature is higher than 130° C., impurities such as phillipsite and gmelinite are simultaneously formed. The time required for crystallization depends on the temperature but the crystallization time is ordinarily 10 to 40 hours.

In the present invention, in order to obtain a high-purity high-silica faujasite type zeolite, in the case where the content of the alumina component $Al_2O_3$ in the homogeneous compound is low, it is preferred that the alkali metal hydroxide concentration in the starting slurry relative to $Al_2O_3$ be maintained at a high level within the range of the crystallizing composition, and in the case where the $Al_2O_3$ content is high, it is preferred that the alkali metal hydroxide concentration relative to $Al_2O_3$ be maintained at a low level.

After completion of crystallization, the formed crystal is subjected to solid-liquid separation and washing to remove the excessite alkali component adhering to the surface, and is then dried to obtain a high-purity faujasite type zeolite having a high $SiO_2/Al_2O_3$ molar ratio.

The mother liquor left after separation of the crystal still contains excessive silica component and alkali component. In the present invention, all of the mother liquor left after separation of the crystal can be recycled as the aqueous solution of the alkali metal silicate to the step of preparing the homogeneous compound.

Since reaction in the presence of excessive silica and alkali components is indispensable for formation of a faujasite type zeolite, it has been a serious problem how to effectively utilize and treat the mother liquor left after separation of the crystal, that is, a dilute aqueous solution of the alkali metal silicate.

In the present invention, since an aqueous alkali metal silicate solution is used as all of the silica source and a homogeneous compound having a certain composition is obtained from this silicate solution and an aluminum-containing aqueous solution irrespectively of the concentrations of both the aqueous solutions, effective utilization of the mother liquor left after separation of the crystal becomes possible, and a high-silica faujasite type zeolite can be prepared at a more reduced cost. This is another characteristic feature of the present invention.

The faujasite type zeolite obtained according to a preferred embodiment of the present invention has a high purity and a high $SiO_2/Al_2O_3$ molar ratio of 4.5 to 6.3, and the powdery zeolite is used widely as an adsorptive separating agent, a catalyst or the like in the powdery form or after it is calcined, molded and ion-exchanged with an appropriate cation according to need.

The present invention will now be described in detail with reference to the following examples.

EXAMPLE 1

An aqueous solution of the aluminum sulfate ($Al_2O_3$=9.89 w/v %, $H_2SO_4$=28.52 w/v %) and an aqueous solution of sodium silicate ($SiO_2$=15.00 w/v %, $Na_2O$=6.06 w/v %, $Al_2O_3$=0.077 w/v %) were simultaneously and continuously supplied at constant rates of 1 l/hr and 4 l/hr, respectively, to an overflow type reactor provided with an ordinary paddle agitator, where reaction was carried out with stirring.

An overflowing opening was arranged so that 1 l of the reaction liquid (slurry) was always kept in the reactor and the excessive reaction liquid overflew the tank, and the residence time was 12 minutes. The pH value of the slurry was 6.7 and the reaction temperature was 32° C.

The overflowing slurry product from the reaction tank was subjected to solid-liquid separation using a centrifugal separator and washed with water until no $SO_4^{-2}$ ion was detected in the washing liquid, whereby a homogeneous compound having a composition shown in Table 1 was obtained. An electron microscope photograph of this homogeneous compound is shown in FIG. 1.

Then, a reactor of the external heating type provided with an ordinary paddle agitator and a reflux condenser at the top thereof was charged with 1926.8 g of an aqueous sodium hydroxide solution having a concentration of 33.2% by weight, and 899 g of the homogeneous compound, corresponding to 14% by weight of the total amount of the homogeneous compound to be used, was added and the mixture was stirred. Aging was conducted at an ambient temperature of 30° C. for 3 hours. After completion of aging, the added homogeneous compound was completely dissolved and a transparent aqueous solution was formed.

Subsequently, 2766 g of deionized water and 5521.2 g of the homogeneous compound, corresponding to 86% by weight of the total amount of the homogeneous compound, were added to the transparent aqueous solution formed by aging, and the mixture was stirred and maintained at an ambient temperature of 30° C. for 1 hour. The added homogeneous compound was hardly dissolved, and the mixture became a lowly viscous slurry in which the concentration of sodium hydroxide was 5.76% by weight.

Then, the temperature of the slurry was elevated and the mixture was maintained at an ambient temperature of 95° C. for 20 hours with stirring to effect crystallization. After completion of crystallization, the product was separated from the mother liquor by filtration, washed with water and then dried at 110° C. The composition of the separated mother liquor is shown in Table 2.

From the results of X-ray diffractometry, it was confirmed that the product was a faujasite type zeolite having an $SiO_2/Al_2O_3$ molar ratio of 5.6 and a crystallinity of 105%. Incidentally, the $SiO_2/Al_2O_3$ molar ratio was determined by the measurement of the lattice constant by X-ray diffractometry. The crystallinity was determined by measuring the sum $I_1$ of the intensities of the following planes from the X-ray diffraction pattern:

$$\begin{bmatrix} (111) \ (220) \ (311) \ (331) \begin{pmatrix} 333 \\ 511 \end{pmatrix} \\ (440) \ (533) \ (642) \begin{pmatrix} 555 \\ 751 \end{pmatrix} (664) \end{bmatrix}$$

and calculating the relative value based on the sum $I_2$ of the intensities of a zeolite of the type Y supplied by Union Carbide Corporation (SK-40) as the crystallinity of 100 according to the following formula:

Crystallinity (%) = $(I_1/I_2) \times 100$

Figure 2:
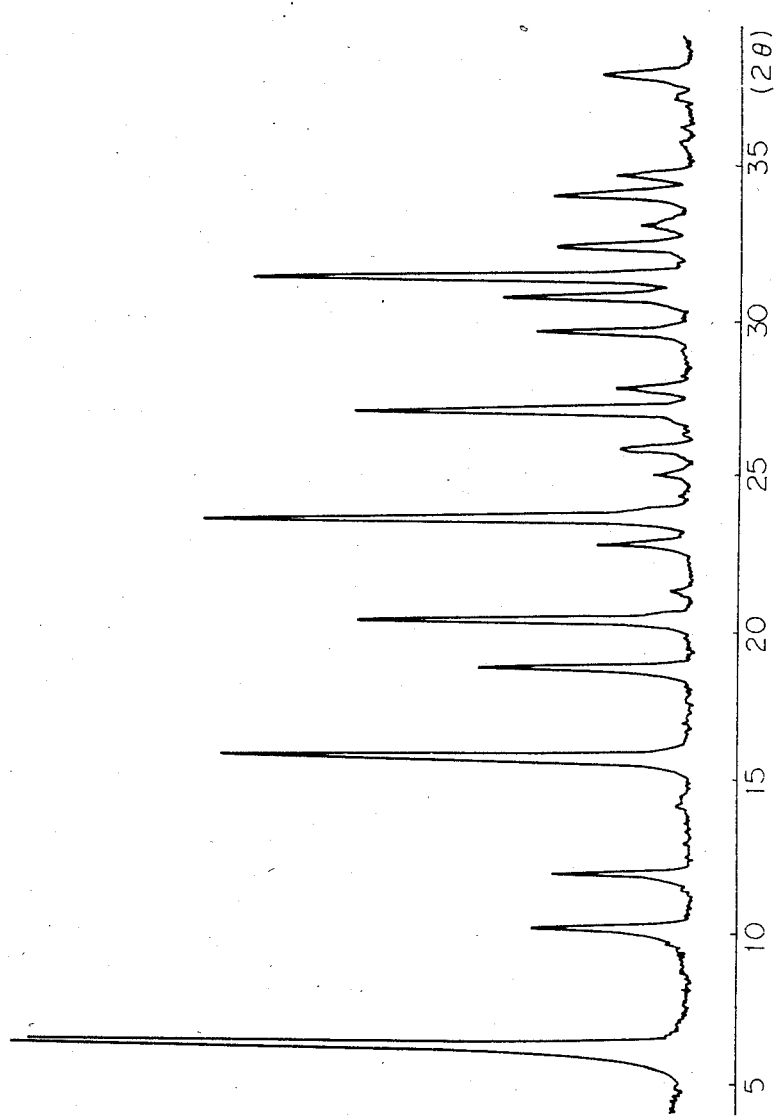
FIG. 2 is a powder X-ray diffraction pattern of the dry product obtained in Example 1, as determined by using a Kα doublet of copper.

The X-ray powder diffraction pattern is shown in FIG. 2.

From the results of electron microscope observation, it was found that the average particle size of the obtained faujasite type zeolite was 0.5 μm.

EXAMPLE 2

The procedures of Example 1 were repeated in the same manner except that crystallization was carried out in the stationary state to obtain a dry product. From the results of X-ray diffractometry, it was confirmed that the $SiO_2/Al_2O_3$ molar ratio of the product was 5.6 and the product was a faujasite type zeolite having a crystallinity of 106%. The mean particle size of the product was 0.5 μm as in case of the product obtained in Example 1.

EXAMPLE 3

The procedures of Example 1 were repeated in the same manner except that the compositions of the aqueous solutions of aluminum sulfate and sodim silicate were changed to ($Al_2O_3$=9.77 w/v %, $H_2SO_4$=32.94 w/v %) and ($SiO_2$=21.00 w/v %, $Na_2O$=6.76 w/v %, $Al_2O_3$=0.107 w/v %), respectively, to obtain a homogeneous compound having a composition shown in Table 1.

The reactor of the external heating type used in Example 1 was charged with 2474 g of an aqueous sodium hydroxide solution having a concentration of 32.4% by weight, and 832.9 g of the homogeneous compound, which corresponded to 14% by weight of the total amount of the homogeneous compound to be used for the reaction, was added and the mixture was stirred. Aging was conducted at an ambient temperature of 30° C. for 3 hours. The homogeneous compound added was completely dissolved and a transparent solution was formed.

Subsequently, 2872.8 g of deionized water and 5116.5 g of the homogeneous compound, which correspond to 86% by weight of the total amount of the homogeneous compound, were added and the mixture was maintained at an ambient temperature of 30° C. for 1 hour. The mixture became a lowly viscous slurry in which the concentration of sodium hydroxide was 7.1% by weight.

Then, the crystallization and post treatment were carried out in the same manner as described in Example 1 to obtain a dry product.

From the results of X-ray diffractometry, it was confirmed that the product was a faujasite type zeolite having an $SiO_2/Al_2O_3$ molar ratio of 5.5 and a crystallinity of 102%. The mean particle size was 0.5 μm as in case of the product of Example 1.

EXAMPLE 4

The procedures of Example 1 were repeated in the same manner except that the compositions of the aqueous aluminum sulfate solution and the aqueous sodium silicate solution were change to ($Al_2O_3$=9.95 w/v %, $H_2SO_4$=28.69 w/v %) and ($SiO_2$=12.00 w/v %, $Na_2O$=6.09 w/v %, $Al_2O_3$=0.061 w/v %), respectively, to obtain a homogeneous compound having a composition shown in Table 1.

The reactor of the external heating type used in Example 1 was charged with 1126.8 g of an aqueous sodium hydroxide solution, and 767.2 g of the homogeneous compound, which corresponded to 14% by weight of the total amount of the homogeneous compound to be used, was added and the mixture was stirred and aged at an ambient temperature of 30° C. for 3 hours. The added homogeneous compound was completely dissolved to form a transparent solution.

Subsequently, 1920.2 g of a deionized water and 4713.8 g of the homogeneous compound, which corresponded to 86% by weight of the total amount of the homogeneous compound to be used, were added and the mixture was stirred and maintained at an ambient temperature of 30° C. for 1 hour. The mixture became a lowly viscous slurry in which the concentration of sodium hydroxide was 4.65% by weight.

The crytallization and post treatment were carried out in the same manner as described in Example 1 to obtain a dry product. From the results of X-ray diffractometry, it was confirmed that the product was a faujasite type zeolite having an $SiO_2/Al_2O_3$ molar ratio of 5.7 and a crystallinity of 105%. The mean particle size was 0.5 μm as in case of the product of Example 1.

EXAMPLE 5

899 g of the homogeneous compound obtained in Example 1 was added to 1471.9 g of an aqueous sodium hydroxide solution having a concentration of 34.79% by weight, and the mixture was stirred and aged at an ambient temperature of 30° C. for 3 hours. The added homogeneous compound was completely dissolved and a transparent solution is formed.

Subsequently, 2113.2 g of deionized water and 5521.2 g of the homogeneous compound were added to the solution and the mixture was stirred and maintained at an ambient temperature of 30° C. for 1 hour. The mixture became a lowly viscous slurry in which the concentration of sodium hydroxide was 5.13% by weight. The crystallization and post treatment were carried out in the same manner as in Example 1 except that the crystallization time was changed to 40 hours, whereby a dry product was obtained. From the results of X-ray diffractometry, it was confirmed that the product was a faujasite type zeolite having an $SiO_2/Al_2O_3$ molar ratio of 6.3 and a crystallinity of 107%. The mean particle size was 0.5 μm as in case of the product of Example 1.

EXAMPLE 6

899 g of the homogeneous compound obtained in Example 1 was added to 2949.3 g of an aqueous sodium hydroxide solution having a concentration of 31.46% by weight, and the mixture was aged at an ambient temperature of 30° C. for 3 hours. The added homogeneous compound was completely dissolved to form a transparent solution.

Subsequently, 4234.3 g of deionized water and 5521.2 g of the homogeneous compound were added to the solution, and the mixture was stirred and maintained at an ambient temperature of 30° C. for 1 hour. The mixture became a lowly viscous slurry in which the concentration of sodium hydroxide was 6.82% by weight. The crystallization and post treatment were carried out in the same manner as described in Example 1 except that the crystallization time was changed to 16 hours, whereby a dry product was obtained. From the results of X-ray diffractometry, it was confirmed that the product was a faujasite type zeolite having an $SiO_2/Al_2O_3$ molar ratio of 5.0 and a crystallinity of 106%. The mean particle size was 0.5 μm as in case of the product of Example 1.

EXAMPLE 7

599.3 g of the homogeneous compound obtained in Example 1 was added to 2420.9 g of an aqueous sodium hydroxide solution having a concentration of 30.84% by weight. The mixture was stirred and aged at an ambient temperature of 30° C. for 3 hours. The added homogeneous compound was completely dissolved to form a transparent solution. Subsequently, 3475.2 g of deionized water and 3680.8 g of the homogeneous compound were added to the solution, and the mixture was maintained at an ambient temperature of 30° C. for 1 hour. The mixture became a lowly viscous slurry in which the concentration of sodium hydroxide was 7.35% by weight. The crystallization and post treatment were carried out in the same manner as described in Example 1 except that the crystallization time was changed to 12 hours, whereby a dry product was obtained. From the results of X-ray diffractometry, it was confirmed that the product was a faujasite type zeolite having an $SiO_2/Al_2O_3$ molar ratio of 4.5 and a crystallinity of 104%. The mean particle size was 0.5 μm as in case of the product of Example 1.

EXAMPLE 8

The procedures of Example 1 were repeated in the same manner except that aging was carried out at an ambient temperature of 60° C. for 0.5 hour and the crystallization time was changed to 40 hours, to obtain a dry product. From the results of X-ray diffractometry, it was confirmed that the product was a faujasite type zeolite having an $SiO_2/Al_2O_3$ molar ratio of 5.6 and a crystallinity of 103%. From the results of electron micrscope observation, it was found that the mean average particle size was 2 μm.

EXAMPLE 9

The procedures of Example 1 were repeated in the same manner except that aging was carried out at an ambient temperature of 20° C. for 8 hours and crystallization was carried out at an ambient temperature of 95° C. for 16 hours, to obtain a dry product. From the results of X-ray diffractometry, it was confirmed that the product was a faujasite type zeolite having an $SiO_2/Al_2O_3$ molar ratio of 5.6 and a crystallinity of 106%. From the results of electron microscope observation, it was found that the mean particle size was 0.2 μm.

EXAMPLE 10

The procedures of Example 1 were repeated in the same manner except that crystallization was carried out in an autoclave at an ambient temperature of 120° C. for 10 hours, to obtain a dry product. From the results of X-ray diffractometry, it was confirmed that the product was a faujasite type zeolite having an $SiO_2/Al_2O_3$ molar raio of 5.5 and a crystallinity of 100%. From the results of electron microscope observation, it was found that the mean particle size was 1 μm.

EXAMPLE 11

The procedures of Example 1 were repeated in the same manner except that aging was carried out at an ambient temperature of 30° C. for 5 hours and crystallization was carried out at an ambient temperature of 80° C. for 72 hours, to obtain a dry product. From the results of X-ray diffractometry, it was confirmed that the product was a faujasite type zeolite having an $SiO_2/Al_2O_3$ molar ratio of 5.7 and a crystallinity of 105%. The mean particle size was 0.5 μm as in case of the product of Example 1.

EXAMPLE 12

A commercially available aqueous solution of sodium silicate and aqueous solution of sodium hydroxide were added to the mother liquor left after separation of the crystal in Example 1 to form an aqueous solution of sodium silicate having the same composition as the composition described in Example 1. The procedures of Example 1 were repeated in the same manner except that a homogeneous compound was prepared by using this aqueous solution of sodium silicate as the silica source, to obtain a dry product. From the results of X-ray diffractometry, it was confirmed that the product was a faujasite type zeolite having an $SiO_2/Al_2O_3$ molar ratio of 5.6 and a crystallinity of 104%.

Comparative Example 1

A kneader type kneading machine (Model FM-NW-40 supplied by Fuji Sangyo K. K.) was charged with 2721.1 g of commercially available white carbon, that is, finely divided amorphous silica ($SiO_2$=88.2% by weight), as the silica source, 1990.2 g a commercially available aqueous solution of sodium aluminate ($Al_2O_3$=20.5% by weight, $Na_2O$=19.0% by weight), 481.6 g of sodium hydroxide (NaOH=98% by weight) and 5919.1 g of deionized water in succession, and aging was carried out at an ambient temperature of 30° C. and a rotational speed of 30 rpm for 24 hours. The slurry mixture became a viscous aqueous gel having the same composition as that of the slurry mixture subjected to crystallization in Example 1.

Then, a part of the aqueous gel was charged in a sealed vessel, and crystallization was carried out in the stationary state at an ambient temperature of 95° C. for 72 hours. The remainder of the aqueous gel was charged in the same reactor as used in Example 1 and crystallization was carried out under stirring at an ambient temperature of 95° C. for 72 hours. After completion of crystallization, the post treatment was carried out in the same manner as described in Example 1 to obtain a dry product. From the results of X-ray diffractometry, it was confirmed that the product obtained by carrying out crystallization in the stationary state was a faujasite type zeolite having an $SiO_2/Al_2O_3$ molar ratio of 5.0, a crystallinity of 98% and a mean particle size of 0.5 μm, and that the product obtained by carrying out crystallization under stirring was composed mainly of phillipsite and gmelinite and a faujasite type zeolite was formed only to a slight extent.

Comparative Example 2

The same starting materials as used in Example 1 were used, and 4 l of the aqueous sodium silicate solution was added to 1 l of the aqueous aluminum sulfate solution with stirring over a period of 10 minutes to effect reaction. After completion of addition, stirring was continued for 1 hour to obtain a viscous pasty slurry product having a pH value of 6.7. The reaction temperature was 35° C. The product was subjected to solid-liquid separation using a centrifugal separation and the solid was washed with water until no $SO_4^=$ ion was detected in the washing liquid. The product was amorphous sodium aluminosilicate having a composition shown in Table 1.

Then, the reaction vessel of the external heating type used in Example 1 was charged with 1603.2 g of an aqueous sodium hydroxide solution having a concentration of 39.9% by weight, and 1222.4 g of the amorphous sodium aluminosilicate, which corresponded to 14% by weight of the total amount of the amorphous sodium aluminosilicate to be used for the reaction, was added to the aqueous sodium hydroxide solution. The mixture was stirred and aged at an ambient temperature of 30° C. for 3 hours. After completion of aging, the added amorphous sodium aluminosilicate was completely dissolved to form a transparent solution.

Subsequently, 777.6 g of deionized water and 7509 g of the amorphous sodium aluminosilicate, which corresponded to 86% by weight of the total amount of the amorphous sodium aluminosilicate to be used for the reaction, were added to the solution, and the mixture was maintained at an ambient temperature of 30° C. for 1 hour.

The slurry mixture became a viscous aqueous gel having the same composition as that of the slurry mixture subjected to crystallization in Example 1.

A part of the aqueous gel was charged in a sealed vessel and crystallization was carried out in the stationary state at an ambient temperature of 95° C. for 48 hours. The remainder of the aqueous gel was crystallized at an ambient temperature of 95° C. for 48 hours under stirring in the same manner as described in Example 1. After completion of crystallization, the post treatment was carried out in the same manner as described in Example 1 to obtain a dry product. From the results of X-ray diffractometry, it was confirmed that each of the product obtained by carrying out crystallization in the stationary state and the product obtained by carrying out crystallization under stirring was composed mainly of phillipsite and gmelinite and a faujasite type zeolite was not formed at all.

Comparative Example 3

The procedures of Example 1 were repeated in the same manner except that the compositions of the aqueous solutions of aluminum sulfate and sodium silicate were changed to ($Al_2O_3$=9.65 w/v %, $H_2SO_4$=45.52 w/v %) and ($SiO_2$=27.00 w/v %, $Na_2O$=8.69 w/v %, $Al_2O_3$=0.138 w/v %), respectively, to obtain homogeneous compound having a composition shown in Table 1. Then, the same reactor of the external heating type as used in Example 1 was charged with 2955.2 g of an aqueous sodium hydroxide solution having a concentration of 31.62% by weight, and 774.1 g of the homogeneous compound, which corresponded to 14% by weight of the total amount of the homogeneous compound to be used for the reaction, was added to the aqueous sodium hydroxide solution and the mixture was stirred and aged at an ambient temperature of 30° C. for 3 hours. The added homogeneous compound was completely dissolved to form a transparent solution was formed. Subsequently, 3332.5 g of deionized water and 4754.7 g of the homogeneous compound, which corresponded to 86% by weight of the total amount of the homogeneous compound, were added to the solution, and the mixture was stirred and maintained at an ambient temperature of 30° C. for 1 hour to obtain a lowly viscous slurry in which the concentration of sodium hydroxide was 7.91% by weight.

The crystallization and post treatment were carried out in the same manner as described in Example 1 to obtain a dry product. From the results of X-ray diffractometry of the product, it was confirmed that phillipsite and gmelinite were simultaneously formed and the crystallinity was 85%.

Comparative Example 4

The procedures of Example 1 were repeated in the same manner except that the compositions of the aqueous solutions of aluminum sulfate and sodium silicate were changed to ($Al_2O_3$=8.06 w/v %, $H_2SO_4$=28.78 w/v %) and ($SiO_2$=10.50 w/v %, $Na_2O$=6.96 w/v %, $Al_2O_3$=0.054 w/v %), respectively, to obtain a homogeneous compound having a composition shown in Table 1. Then, the same reactor of the external heating type as used in Example 1 was charged with 1006 g of an aqueous sodium hydroxide solution having a concentration of 34.99% by weight and 695.9 g of the homogeneous compound, which corresponded to 14% by weight of the total amount of the homogeneous compound to be used for the reaction, was added to the aqueous sodium hydroxide solution. The mixture was stirred and aged at an ambient temperature of 30° C. for 3 hours. The added homogeneous compound was completely dissolved to form a transparent solution. Subsequently, 1924.6 g of deionized water and 4274.5 g of the homogeneous compound, which corresponded to 86% by weight of the total amount of the homogeneous compound, were added to the solution, and the mixture was stirred and maintained at an ambient temperature of 30° C. for 1 hour. The mixture became a lowly viscous slurry in which the concentration of sodium hydroxide was 4.46% by weight. The crystallization and post treatment were carried out in the same manner as described in Example 1 to obtain a dry product. From the results of X-ray diffractometry of the product, it was confirmed that phillipsite and gmelinite were simultaneously formed and the crystallinity was 54%.

Comparative Example 5

899 g of the homogeneous compound obtained in Example 1 was added to to 1017.3 g of an aqueous sodium hydroxide solution having a concentration of 37.74% by weight, and the mixture was stirred and aged at an ambient temperature of 30° C. for 3 hours. The added homogeneous compound was completely dissolved to form a transparent solution. Subsequently, 3836.9 g of deionized water and 5521 g of the homogeneous compound were added to the solution, and the mixture was stirred and maintained at an ambient temperature of 30° C. for 1 hour. The mixture became a lowly viscous slurry in which the concentration of sodium hydroxide was 3.40% by weight. The crystallization and post treatment were carried out in the same manner as described in Example 1 except that the crystallization time was changed to 96 hours, whereby a dry product was obtained. From the results of X-ray diffractometry of the product, it was confirmed that the product was amorphous and a faujasite type zeolite was not formed at all.

Comparative Example 6

899 g of the homogeneous compound obtained in Example 1 was added to 4200 g of an aqueous sodium hydroxide solution having a concentration of 30.5% by weight, and the mixture was stirred and aged at an ambient temperature of 30° C. for 3 hours. The added homogeneous compound as completely dissolved to form a transparent solution. Subsequently, 629 g of deionized water and 5521 g of the homogeneous compound were added to the solution, and the mixture was stirred and aged at an ambient temperature of 30° C. for 3 hours. The mixture became a lowly viscous slurry in which the concentration of sodium hydroxide was 11.4% by weight. The crystallization and post treatment were carried out in the same manner as described in Example 1 except that the crystallization temperature was changed to 20 hours, whereby a dry product was obtained. From the results of X-ray diffractometry, it was confirmed that the product was a faujasite type zeolite having an $SiO_2/Al_2O_3$ molar ratio of 4.0 and a crystallinity of 90%, which contained a minute amount of phillipsite.

Comparative Example 7

The procedures of Example 1 were repeated in the same manner except that aging was carried out at an ambient temperature of 30° C. for 0.25 hour. The crystallinity of the faujasite type zeolite obtained by carrying out crystallization for 72 hours was 42%.

Comparative Example 8

The procedures of Example 1 were repeated in the same manner except that aging was carried out at an ambient temperature of 30° C. for 20 hours. When crystallization was carried out for 20 hours, phillipsite was simultaneously formed and the crystallinity of the faujasite type zeolite was 80%.

EXAMPLE 13

The procedures of Example 1 were repeated in the same manner except that the crystallization temperature was changed to 65° C. The crystallinity of the faujasite type zeolite obtained by carrying out crystallization for 72 hours was 12%.

EXAMPLE 14

The procedures of Example 1 were repeated in the same manner except that the crystallization temperature was changed to 140° C. When crystallization was conducted for 20 hours, phillipsite was simultaneously formed and the crystallinity of the faujasite type zeolite was 72%.

Comparative Example 9

The same reactor of the external heating type as used in Example 1 was charged with 4836.3 g of an aqueous sodium hydroxide solution having a concentration of 13.46% by weight, and 6420 g of the homogeneous compound was added to the aqueous solution to form a starting slurry, in which the concentration of sodium hydroxide was 5.76% by weight as in Example 1. Then, 100 g, as calculated as the anhydride, of the faujasite type zeolite having an $SiO_2/Al_2O_3$ molar ratio of 5.6, which was obtained in Example 1, was added as the seed crystal to the slurry, and the slurry was maintained at an ambient temperature of 30° C. for 1 hour. The crystallization and post treatment were carried out in the same manner as described in Example 1, whereby a dry product was obtained. From the results of X-ray diffractometry, it was confirmed that phillipsite and gmerlinite were simultaneously formed and the crystallinity was 92%.

TABLE 1

| | Chemical Composition (% by weight) of Amorphous Sodium Aluminosilicate | | | |
|---|---|---|---|---|
| | $Na_2O$ (dry base) | $Al_2O_3$ (dry base) | $SiO_2$ (dry base) | $H_2O$ (wet base) |
| Examples 1, 2, 5, 6, 7, 8, 9, 10, 11, 13, 14, 15 and 16 and Comparative Examples 5, 6 and 7 | 8.12 | 13.35 | 78.53 | 52.4 |
| Example 3 | 6.17 | 10.16 | 83.67 | 55.0 |
| Example 4 | 9.63 | 15.84 | 74.53 | 53.0 |
| Example 12 | 8.11 | 13.36 | 78.53 | 52.3 |
| Comparative Example 2 | 8.13 | 13.35 | 78.52 | 65.1 |
| Comparative Example 3 | 4.98 | 8.20 | 86.82 | 55.0 |
| Comparative Example 4 | 10.62 | 17.47 | 71.91 | 52.9 |

TABLE 2

| Chemical Composition (% by weight) of Separated Mother Liquor | | |
|---|---|---|
| $Na_2O$ | $Al_2O_3$ | $SiO_2$ |
| 6.05 | 0.00 | 12.90 |

We claim:
1. A process for the preparation of a high-silica faujasite type zeolite having a silica/alumina ratio of at least 4.5, which process comprises the steps of:
(a) simultaneously and continuously supplying an aqueous solution of an alkali metal silicate and an aqueous solution of an aluminum-containing compound into a reaction zone whereby the alkali metal silicate is continuously reacted with the aluminum-containing compound to prepare a homogeneous phase compound of a granular amorphous aluminosilicate containing, based on the anhydride, 10 to 16% by weight as $Al_2O_3$, of aluminum, about 74.52 to about 83.67% by weight, as $SiO_2$, of silica and about 6.17 to about 9.63% by weight, calculated in terms of $Na_2O$, of alkali metal, said granular homogeneous phase amorphous aluminosilicate prepared in the reaction zone in the form of an aqueous slurry having a pH value of 5 to 9;
(b) subjecting the aqueous slurry of the granular homogeneous phase amorphous aluminosilicate to solid-liquid separation;
(c) aging a part of the granular homogeneous phase amorphous aluminosilicate thus separated in an aque- ous alkali metal hydroxide solution at a temperature of 10° to 95° C. for 0.5 to 12 hours; and then (d) crystallizing a mixture of the aged granular homogeneous phase amorphous aluminosilicate and the nonaged granular homogeneous phase amorphous aluminosilicate in an aqueous alkali metal hydroxide solution having a concentration of 4 to 10% by weight.

2. A process according to claim 1, wherein the granular homogeneous phase amorphous aluminosilicate has a substantially spherical shape and has a particle size of from 1 to 500 μm.

3. A process according to claim 1, wherein the aqueous alkali metal silicate solution and the aqueous aluminum-containing compound solution are supplied at a substantially constant ratio.

4. A process according to claim 1, wherein the alkali metal silicate solution is an aqueous solution of at least one compound selected from the group consisting of sodium silicate, potassium silicate and lithium silicate.

5. A process according to claim 1, wherein the aluminum-containing aqueous solution is an aqueous solution of at least one compound selected from the group consisting of aluminum sulfate, aluminum nitrate, aluminum chloride, sodium aluminate and potassium aluminate.

6. A process according to claim 1, wherein the residence time of the aqueous slurry in the reaction zone is at least 3 minutes.

7. A process according to claim 1, wherein the alkali metal hydroxide is at least one compound selected from the group consisting of sodium hydroxide, potassium hydroxide and lithium hydroxide.

8. A process according to claim 1, wherein the aqueous alkali metal hydroxide solution is an aqueous sodium hydroxide solution.

9. A process according to claim 1, wherein the amount of aqueous alkali metal hydroxide solution used in step (d) is such that the proportion of the homogeneous compound in the total amount of the homogeneous compound and the aqueous alkali metal by hydroxide solution is in the range of from 15 to 35% by weight based on the total amount of the starting slurry based on the anhydride.

10. A process according to claim 1, wherein the granular homogeneous phase amorphous aluminosilicate is aged in step (c) at an ambient temperature of 20° to 70° C. for 1 to 4 hours.

11. A process according to claim 1, wherein the amount of the granular homogeneous phase amorphous aluminosilicate to be aged is in the range of from 10 to 37% by weight based on the total weight of said aluminosilicate to be crystallized.

12. A process according to claim 1, wherein the aqueous alkali metal hydroxide solution in step (c) is an aqueous sodium hydroxide solution having a concentration of at least 25% by weight.

13. A process according to claim 1, wherein the crystallization is carried out at a temperature of from 75° to 130° C.

14. A process according to claim 1, wherein the crystallization is carried out for 10 to 40 hours.

15. A process according to claim 1, wherein the reaction mother liquor left after crystallization is separated and is used as an alkali metal silicate source for the preparation of the granular homogeneous phase amorphous aluminosilicate.

* * * * *